United States Patent [19]
Williams et al.

[11] Patent Number: 5,641,411
[45] Date of Patent: Jun. 24, 1997

[54] METHOD OF DETOXIFYING INDUSTRIAL DISCHARGE WATERS

[75] Inventors: Terry M. Williams, Ambler, Pa.; Paul F. D. Reeve, Valbonne, France

[73] Assignee: Rohm and Haas Company, Philadelphia, Pa.

[21] Appl. No.: 683,594

[22] Filed: Jul. 15, 1996

Related U.S. Application Data

[63] Continuation-in-part of Ser. No. 440,860, May 15, 1995.
[51] Int. Cl.⁶ .................................................. C02F 1/68
[52] U.S. Cl. ........................... 210/749; 210/757; 210/764
[58] Field of Search ................................ 210/749, 757, 210/764

[56] References Cited

U.S. PATENT DOCUMENTS

| | | | |
|---|---|---|---|
| 4,204,954 | 5/1980 | Jacob | 210/749 |
| 5,169,536 | 12/1992 | Vasconcellos et al. | 210/691 |
| 5,387,717 | 2/1995 | Duckett et al. | 588/206 |
| 5,486,296 | 1/1996 | Petrille, III et al. | 210/749 |
| 5,518,636 | 5/1996 | Petrille, III et al. | 210/749 |

*Primary Examiner*—Neil McCarthy
*Attorney, Agent, or Firm*—Julie J. L. Cheng

[57] ABSTRACT

A method of detoxifying biocide which is toxic to aquatic life comprising contacting said biocide with a water soluble organic thiol compound. Applications of the method are primarily for biocide spills or for industrial effluents which comprise biocide and must be detoxified prior to release into the environment, and must pass a photoluminescent bacterial assay. Kits are also disclosed.

12 Claims, No Drawings

METHOD OF DETOXIFYING INDUSTRIAL DISCHARGE WATERS

This is a continuation-in-part application of U.S. patent application Ser. No. 08/440,860 filed May 15, 1995.

This invention relates to detoxifying biocide, especially biocide spills and industrial discharge waters which contain biocide.

Biocides are generally used in industrial waters to protect the waters by controlling microorganisms such as fungi, algae, and bacteria during the industrial process. Among the most prevalently used biocides are mixtures of 5-chloro-2-methyl-4-isothazolin-3-one ("CMI" or 5-chloro-2-methyl-3-isothiazolone) and 2-methyl-4-isothaolin-3-one ("MI" or 2-methyl-3-isothiazolone). Prior to discharging industrial waters which have been treated with such biocides, it is common to use a deactivating agent. Rohm and Haas Company, Philadelphia, Pa., USA, bulletin number CS-456B, October 1986, entitled "Kathon® WT Cooling Tower, Air Washer and Papermill Slimicide," mentions sodium bisulfite as the standard deactivating agent for cooling tower blowdown effluent containing 3-isothiazolones.

Due to environmental regulations, such industrial discharge waters must pass certain toxicity tests prior to discharge in wastewater streams which ultimately are discharged into waterways containing aquatic life. The tests are designed to simulate typical aquatic life and to monitor the toxicity of the effluent to such life. A test which has been adapted as a standard by many regulator authorities is a photoluminescent bacterial assay which monitors the light output of certain bacteria which have photoluminescent properties. When these bacteria are exposed to toxicants, the light output is inhibited. Typically, less than 35%, and preferably less than 20%, inhibition of light output is considered non-toxic, at a 1:12 dilution of the discharge water to be tested. Generally, if the water to be tested is diluted more than 1:12, the % inhibition of light output will be lower. If the water to be tested is diluted less than 1:12 the % inhibition of light output will be greater. The most prevalent brand of such test is the Microtox® test which comprises a photobacterium of the genus Vibrio, such as *Vibrio fisheri* (formerly known as *Photobacterium phosphoreum*).

A problem in the art is that while sodium bisulfite does deactivate 3-isothiaolones, the resultant end product demonstrates toxicity to aquatic life, as measured by the photoluminescent bacterial assay. Therefore, treatment of industrial discharge waters containing 3-isothiazolones with sodium bisulfite is not the most effective detoxification treatment.

We have discovered a method of detoxifying biocide, either in spills or in industrial effluent which comprises biocide which is toxic to aquatic life comprising contacting said biocide with a water soluble organic thiol compound, and optionally base, for an effective period of time in an amount sufficient to detoxify said biocide when said biocide is an effluent, said effluent becomes non-toxic as measured by a photoluminescent bacterial assay.

Prior to our invention, it was believed that 3-isothiazolones ring-open in the presence of thiols by the same mechanism as they ring-open in the presence of sodium bisulfite, the prior art standard deactivating agent. We have unexpectedly discovered that thiols are much more effective as deactivating agents than sodium bisulfite.

This method is especially useful to treat industrial effluent comprising 5-chloro-2-methyl-4-isothazolin-3-one; 2-methyl-4-isothazolin-3-one; 4,5-dichloro-2-n-octyl-4-isothiazolin-3-one; 2-n-octyl-4-isothiazolin-3-one; benzisothiazolone; 2-methyl-4,5-trimethylene-4-isothiazolin-3-one; and mixtures thereof.

Other biocides which can be detoxified by this method are, for example, methylenebisthiocyanate ("MBT"); 2,2-dibromo-3-nitrilopropionamide ("DBNPA"); bromochlorodimethylhydantoin; glutaraldehyde; hypohalous acids, such as hypobromous acid, hypochlorous acid, hypochlorite, and the like; 1,4-bis(bromoacetoxy)-2-butene; 4,5-dichloro-1,1-dithiacyclopentene-3-one; and 2-bromo-2-nitropropane-1,3-diol.

Industrial discharge waters or effluent are wastewater streams from various industrial processes, generally containing at least 50% by weight water, usually as high a percentage of water as possible. Industrial processes having discharge waters suitable for treatment by the invention include, for example, cooling towers, air washers, paper mills, pulp mills, metal working fluid manufacture and use, latex manufacture and use, oilfield drilling fluid manufacture and use, fuel bottoms, electrocoating processes, cosmetics manufacture, and household or consumer product manufacture.

Biocide spills are a problem in this art, and this method is a more effective way to decontaminate the surfaces which have been contacted by the spill, for safety and environmental reasons.

While any water soluble organic thiol can be used according to this invention, the preferred thiol compounds are thioglycollic acid and its alkaline or alkaline earth salts; cysteine; cysteine hydrohalide salts, such as cysteine hydrochloride, cysteine hydrobromide, and the like; mercaptoethanol; mercaptopropionic acid; methyl mercaptopropionate; glutathione; and thioglycollate; with thioglycollate, cysteine and cysteine hydrohalide salts being the most preferred.

The amount of thiol compound used depends on the type and amount of biocide, the other components in the spill or the effluent, the contact time, the temperature of contact, and other factors. From 0.1 parts per million ("ppm") to 2% by weight based on effluent has been found suitable for many environments, with 1 to 10 ppm being preferred. Based on one part by weight of biocide in the effluent, 1 to 2 parts of thiol compound is especially suitable.

While any water soluble organic thiol compound is effective at detoxifying biocides, certain biocides such as MBT and DBNPA are most effectively detoxified when base is combined with the organic thiol compound. The base may be combined with the organic thiol compound and biocide in any order. The ratio of base to organic thiol compound is from 1:10 to 10:1. The preferred ratio is 1:2.

Suitable bases include inorganic bases. Preferred inorganic bases are sodium hydroxide, potassium hydroxide, calcium carbonate, and potassium carbonate. The most preferred inorganic bases are calcium carbonate and potassium carbonate.

The preferred effective period of time of contact between the thiol compound and the spill or effluent comprising the biocide is 5 minutes to 4 hours. In the case of a water treatment process, especially a cooling tower, a contact period of 5 minutes to 1 hour is very suitable.

The contact between the thiol compound and the effluent can be in the industrial process vessel, or can be in a separate vessel or container into which the effluent is transferred prior to discharge. The contact can also be effectuated in certain cases in a pipe or other transfer vessel between the industrial process vessel and the discharge port.

One means of using the invention is to prepare kits which comprise an organic thiol in a plastic or plastic lined container, inert adsorbant, a spill pillow, and a pair of gloves.

General Test Method

The 3-isothiazolone used in each of the following examples was an approximate 3:1 mixture of CMI and MI. All percentages are by weight. Samples were analyzed for CMI or CMI and MI remaining by reverse phase HPLC with UV detection. Amounts of compounds in solution are reported in ppm. Samples were considered detoxified when they caused 35% or less inhibition of light output in the photoluminescent bacterial assay at a 1:12 dilution of the water to be tested.

Flasks containing a known amount of synthetic cooling water ("SCW") were placed in a shaking water bath at either 25° or 35° C. and allowed to equilibrate. An amount of 3-isothiazolone biocide (1.5% in water) was then added to the flask to achieve the desired concentration of 3-isothiazolone in solution. An aliquot of the solution was taken five minutes after addition of the 3-isothiazolone for photoluminescent bacterial assay and CMI content analyses. After the aliquot was taken, the flasks were dosed with a detoxifying agent. Additional aliquots of the solution were then taken at various time points for the photoluminescent bacterial assay and CMI content analyses.

The SCW's used in the examples are described in Table 1. The alkalinity, calcium hardness, and magnesium hardness are all reported as calcium carbonate equivalents. EDTA is ethylenediaminetetraacetic acid.

TABLE 1

Synthetic Cooling Waters (SCW)

| Components | SCW I | SCW II |
| --- | --- | --- |
| pH | 8.5 | 8.5 |
| Alkalinity | 200 ppm | 100 ppm |
| Calcium Hardness | 400 ppm | 400 ppm |
| Magnesium Hardness | 100 ppm | 100 ppm |
| Nitrogen (as $(NH_4)_2SO_4$) | 19 ppm | 0 |
| Phosphorus (as $K_2HPO_4$) | 5.6 ppm | 0 |
| Iron (as $FeCl_3 \cdot 6H_2O$) | 0.5 ppm | 0 |
| Disodium EDTA | 0.6 ppm | 0 |
| Scale-Corrosion Inhibitors | Yes | No |

Photoluminescent Bacterial Assay

A photoluminescent bacterial assay was used to determine the degree of toxicity of a test sample by exposure to bioluminescent bacteria and measurement of the light output by means of a photodetector. The difference in light output between a control and the test sample is proportional to the toxicity of the test sample.

A 25 ml aliquot of the SCW solution was taken, the pH was adjusted to 7±0.2 with 1 N hydrochloric acid, and 0.5 g. of sodium chloride was added, to give an aliquot having 2% sodium chloride content. The aliquot was then further diluted 1:6 by volume with a high purity 2% sodium chloride solution.

A stock solution of *Vibrio fisheri* was prepared at $10^8$ cells/ml. Ten μl of the stock solution was transferred to a cuvette containing 0.5 ml saline diluent. To this was added 0.5 ml ml of the 1:6 diluted aliquot (to yield a final dilution of 1:12 for the aliquot) and the sample analyzed for light output. Results are reported as percent light inhibition compared to controls (in saline diluent only).

EXAMPLE 1

SCW I was added to each of 3 flasks, labeled Samples 1-1, 1-2, and 1-3, which were then placed in the shaking water bath at 35° C. After equilibration, sufficient 3-isothiazolone (1.5% in water) was added to each of the three flasks to give a 1.5 ppm solution. To Sample 1—1 was added sufficient cysteine hydrochloride as detoxifying agent to yield 50 ppm in solution. To Sample 1–2 was added sufficient sodium bisulfite as detoxifying agent to yield 50 ppm in solution. Sample 1–3 contained no detoxifying agent, only 3-isothiazolone. Aliquots were taken after 5, 60, 120, 180, and 240 minutes. The aliquots were analyzed for amount of CMI present and were also subjected to the photoluminescent bacterial assay described above. The results are reported in Tables 2 and 3, respectively.

TABLE 2

Amount of CMI Remaining

| Time (minutes) | Sample 1-1 | Sample 1-2* |
| --- | --- | --- |
| 5 | 1.173 ppm | 1.159 ppm |
| 60 | <0.075 ppm | <0.075 ppm |
| 120 | <0.075 ppm | <0.075 ppm |
| 180 | <0.075 ppm | 0.075 ppm |
| 240 | <0.075 ppm | 0.079 ppm |

*= Comparative

TABLE 3

Photoluminescent Bacterial Assay

| | % Light Inhibition | | |
| --- | --- | --- | --- |
| Time (minutes) | Sample 1-1 | Sample 1-2* | Sample 1-3* |
| 5 | 26.45 | 55.83 | 72.29 |
| 60 | 14.15 | 52.26 | 70.17 |
| 120 | 3.53 | 53.05 | 71.75 |
| 180 | 5.92 | 56.80 | 75.02 |
| 240 | 4.97 | 54.32 | 74.93 |

*= Comparative

From the data in Table 2, it can be seen that both cysteine and bisulfite deactivate the 3-isothiazolone within 1 hour. The data in Table 3 show that only cysteine effectively detoxified the 3-isothiazolone. Bisulfite was ineffective in detoxifying 3-isothiazolone.

EXAMPLE 2

The effect of different concentrations of cysteine on the detoxification of 3-isothiazolone was determined. Flasks were prepared as described in Example 1, using SCW II, and placed in the shaking water bath at 35° C. Samples in Table 4 marked with an asterisk (*) were placed in the shaking water bath at 25° C., rather than at 35° C. Each flask was dosed with 3-isothiazolone to give a 1.5 ppm solution. To the flasks were added sufficient amounts of cysteine hydrochloride as detoxifying agent, to give the final cysteine concentrations in solution reported in Table 4. Aliquots were taken at various time points as described in Example 1 and subjected to the photoluminescent bacterial assay. The results are reported in Table 4.

TABLE 4

% Light Inhibition at Various Concentrations of Cysteine

| Time (min) | ppm Cysteine Hydrochloride | | | | | | | | | |
|---|---|---|---|---|---|---|---|---|---|---|
| | 0* | 3* | 6* | 10 | 10 | 10* | 25 | 25 | 50 | 50 |
| 5 | 70 | 12 | 13 | 21 | 16 | 16 | 29 | 27 | 35 | 30 |
| 60 | 71 | 14 | 14 | 15 | 16 | 14 | 18 | 19 | 19 | 21 |
| 120 | 69 | 11 | 15 | 9 | 17 | 21 | 16 | 23 | 16 | 28 |
| 180 | 71 | 12 | 14 | — | 16 | 18 | — | 22 | — | 22 |

From these data, it can be clearly seen that 3 ppm cysteine completely detoxifies a 1.5 ppm 3-isothiazolone treated sample within 5 minutes.

EXAMPLE 3

Example 2 was repeated using different concentrations of mercaptopropionic acid ("MPA") instead of cysteine as the detoxifying agent. The concentrations of MPA, in ppm, are reported in Table 5. The flasks were placed in a shaking water bath at 25° C. Aliquots were taken at various time points as described in Example 1 and subjected to the photoluminescent bacterial assay. The results are reported in Table 5.

TABLE 5

% Light Inhibition at Various Concentrations of MPA as Detoxifying Agent

| Time (min) | ppm MPA | | | | | | |
|---|---|---|---|---|---|---|---|
| | 1 | 1 | 3 | 3 | 5 | 5 | 5 |
| 5 | 56 | 47 | 13 | 14 | 11 | 12 | 11 |
| 60 | 60 | 54 | 10 | 7 | 10 | 2 | 7 |
| 120 | 55 | 42 | 13 | 4 | 12 | 4 | 2 |
| 180 | — | 48 | — | 6 | — | 4 | 5 |

From these data it can be seen that 3 ppm or more of MPA is effective at detoxifying 1.5 ppm 3-isothiazolone within 5 minutes.

EXAMPLE 4

Example 2 was repeated using different concentrations of mercaptoethanol ("ME") instead of cysteine as the detoxifying agent. The concentrations of ME, in ppm, are reported in Table 6. The flasks were placed in a shaking water bath at 25° C. Aliquots were taken at various time points as described in Example 1 and subjected to the photoluminescent bacterial assay. The results are reported in Table 6.

TABLE 6

% Light Inhibition at Various Concentrations of ME as Detoxifying Agent

| Time (min) | ppm ME | | | |
|---|---|---|---|---|
| | 1 | 3 | 5 | 5 |
| 5 | 34 | 3 | 5 | 8 |
| 60 | 32 | 5 | 3 | 8 |
| 120 | 27 | 5 | 2 | 6 |
| 180 | — | — | — | 5 |

From these data it can be seen that 3 ppm or more of ME is effective in detoxifying 1.5 ppm 3-isothiazolone within 5 minutes.

EXAMPLE 5

Example 2 was repeated using 5 ppm (in solution) of methylmercaptopropionate ("MMP") instead of cysteine as the detoxifying agent. The flasks were placed in a shaking water bath at 25° C. Aliquots were taken at various time points as described in Example 1 and subjected to the photoluminescent bacterial assay. The results are reported in Table 7.

TABLE 7

% Light Inhibition at 5 ppm of MMP as Detoxifying Agent

| Time (min) | 5 ppm MMP |
|---|---|
| 5 | 11 |
| 60 | 7 |
| 120 | 2 |
| 180 | 5 |

From these data it can be seen that MMP is effective in detoxifying 3-isothiazolone within 5 minutes.

EXAMPLE 6

This example demonstrates the effectiveness of cysteine to detoxify 3-isothiazolones in a commercial cooling tower. This test was conducted using a 35,000 gallon (132.5 m$^3$) cooling tower in Spring House, Pa. The temperature of the cooling tower was 25° C. and the water had a pH of 8.0. Sufficient 3-isothiazolone (1.5% in water) was metered into the cooling tower over a 2 hour period to give a concentration of 2.3 ppm of the 3-isothiazolone in the cooling tower water. An aliquot of cooling tower water was taken before the addition of the 3-isothiazolone (a sample blank, labeled as Sample 6-1), immediately after the 3-isothiazolone had been metered into the cooling tower (0 minutes, labeled as Sample 6-2), 120 minutes after 3-isothiazolone addition (labeled as Sample 6-3), and 130 minutes after 3-isothiazolone addition (labeled as Sample 6-4). After Sample 6-4 was taken, sufficient cysteine hydrochloride was added to give a concentration of 3 ppm of cysteine in the cooling tower. Another aliquot, labeled as Sample 6-5, was taken 30 minutes after the addition of the cysteine The aliquots were analyzed for amount of 3-isothiazolone present and were also subjected to the photoluminescent bacterial assay. The results are reported in Table 8.

TABLE 8

| Sample | % Light Inhibition | ppm 3-Isothiazolone |
|---|---|---|
| 6-1 | 22 | 0 |
| 6-2 | 86 | 2.3 |
| 6-3 | 80 | 2.0 |
| 6-4 | 76 | 2.1 |
| 6-5 | 20 | 0.2 |

These data show that 3 ppm of cysteine is effective within 30 minutes in detoxifying 2.3 ppm of 3-isothiazolone in cooling tower water. Results show that the toxicity of the cooling tower water containing 3-isothiazolone plus cysteine was equal to the toxicity prior to addition of the biocide to the water (i.e. background level).

EXAMPLE 7

Thioglycolate (5%) was used as a deactivant for a 2% active 3-isothiazolone solution. A mix of 1:4 by weight was used, representing a ratio of 10:1 thioglycolate to 3-isothiazolone. An HPLC analysis on this mixture gave a total isothiazolinone content of less than the detection limit after a contact time of 30 minutes.

EXAMPLE 8

To a solution of DBNPA (20% in dipropylene glycol) were added 10% sodium carbonate and 3.51% calcium thioglycolate resulting in a ratio of 1:2:4 respectively. The pH of the mix was 9.1, and the solution became orange, with an associated white precipitate of calcium carbonate. Within half an hour of the treatment there was no DBNPA in the solution as determined by HPLC. The solution was effectively deactivated.

EXAMPLE 9-COMPARATIVE

Example 2 was repeated using various concentrations of hydrogen peroxide ($H_2O_2$), a known detoxifying agent for 3-isothiazolones, instead of cysteine. The flasks were placed in a shaking water bath at 25° C. Aliquots were taken after 5 and 60 minutes and subjected to the photoluminescent bacterial assay. The results are reported in Table 9.

TABLE 9

| | % Light Inhibition | | |
|---|---|---|---|
| Time (minutes) | 25 ppm $H_2O_2$ | 50 ppm $H_2O_2$ | 100 ppm $H_2O_2$ |
| 5 | 67 | 67 | 66 |
| 60 | 67 | 64 | 60 |

These data show that hydrogen peroxide is ineffective in detoxifying 3-isothiazolones.

EXAMPLE 10-COMPARATIVE

Example 2 was repeated using various concentrations of sodium thiosulfate ($Na_2S_2O_3$), a known detoxifying agent for 3-isothiazolones, instead of cysteine. The flasks were placed in a shaking water bath at 25° C. Aliquots were taken after 5 and 60 minutes and subjected to the photoluminescent bacterial assay. The results are reported in Table 11.

TABLE 10

| % Light Inhibition at Various Concentrations of $Na_2S_2O_3$ as Detoxifying Agent | | | | |
|---|---|---|---|---|
| | ppm Sodium Thiosulfate | | | |
| Time (minutes) | 5 ppm | 10 ppm | 25 ppm | 50 ppm |
| 5 | 67 | 67 | 66 | 64 |
| 60 | 67 | 64 | 60 | 67 |

These data show that sodium thiosulfate is ineffective in detoxifying 3-isothiazolones.

EXAMPLE 11-COMPARATIVE

Example 2 was repeated using various concentrations of tetrahydro-3,5-dimethyl-2H-1,3,5-thiadiazine-2-thione ("DMTT"), a known detoxifying agent for 3-isothiazolones, instead of cysteine. The flasks were placed in a shaking water bath at 25° C. Aliquots were taken after 5, 60, 120 and 180 minutes and subjected to the photoluminescent bacterial assay. The results are reported in Table 12.

TABLE 11

| % Light Inhibition at Various Concentrations of DMTT as Detoxifying Agent | | | | |
|---|---|---|---|---|
| | ppm DMTT | | | |
| Time (minutes) | 10 ppm | 25 ppm | 50 ppm | 100 ppm |
| 5 | 65 | 60 | 48 | 34 |
| 60 | 68 | 56 | 45 | 40 |
| 120 | 66 | 49 | 39 | 39 |
| 180 | 68 | 51 | 42 | 43 |

These data show that DMTT is ineffective in detoxifying 3-isothiazolones.

EXAMPLE 12

Solutions of organic thiols are effectively used to decontaminate 3-isothiazolone spills or contaminated surfaces. As much of the spill as possible is absorbed using inert adsorbants, such as diatomaceous earth, sand, etc. The adsorbed material is placed into a container with a polyethylene liner.

Prepare a 10% solution of cysteine or cysteine hydrochloride. Apply at least a 10-fold excess volume of the cysteine solution to the area contaminated with 3-isothiazolone that could not be absorbed with the inert adsorbants. Allow the cysteine solution to remain in contact with the contaminated liquid for 30 minutes to one hour. After this time, the resulting liquid may be safely discharged or flushed from the area using large volumes of water.

The adsorbed material in the container is decontaminated by adding sufficient cysteine solution, as described below, to cover all adsorbed materials. The decontamination reaction is allowed to proceed for at least 24 hours. The material is then discharged according to local, state, or federal regulations.

EXAMPLE 13

A spill kit for the decontamination of 3-isothiazolones is made up of the following components: a 5 gallon (0.02 $m^3$) plastic lined pail, neoprene or nitrile gloves, a I gallon (0.004 $m^3$) plastic container with a "fill" mark at the three liter level and a lid, 2 spill pillows (1 and 4 liter sizes), inert adsorbent (clay or vermiculite), and 300 g cysteine or 390 g cysteine hydrochloride.

When a 3-isothiazolone spill occurs, the user opens the 5 gallon pail, removes the contents, puts on the neoprene or nitrile gloves, dikes the spill with the pillows or inert absorbent to absorb as much liquid as possible then transfers the adsorbed material to the empty 5 gallon pail. The user then adds water to the "fill" line on the 1 gallon container containing cysteine or cysteine hydrochloride, places the lid on the pail and shakes well for 1 minute. The resultant decontamination solution (10% cysteine) is used to treat the contents of the 5 gallon pail (at least 10 volumes of decontamination solution per estimated spill volume). The user must completely wet the pillows or inert adsorbent and cover the surrounding area of the spill with the decontamination solution, allowing the decontamination solution to remain in contact with the area for 30 minutes to one hour. After this time, the resulting liquid may be safely discharged or flushed from the area using large volumes of water. The user then places the gloves and 1 gallon pail in the 5 gallon pail and closes it, disposing of pail according to local, state, or federal regulations.

What is claimed is:

1. A method of detoxifying biocide which is toxic to aquatic life comprising contacting said biocide with a water soluble organic thiol compound, and optionally base, for an effective period of time in an amount effective to render said biocide non-toxic to aquatic life.

2. Method according to claim 1 wherein said biocide is selected from 5-chloro-2-methyl-4-isothazolin-3-one; 2-methyl-4-isothazolin-3-one; 4,5-dichloro-2-n-octyl-4-isothiazolin-3-one; 2-n-octyl-4-isothiazolin-3-one; benzisothiazolone; 2-methyl-4,5-trimethylene-4-isothiazolin-3-one; methylenebisthiocyanate; 2,2-dibromo-3-nitrilopropionamide; bromochlorodimethylhydantoin: glutaraldehyde; hypobromous acid, hypochlorous acid, hypochlorite; 1,4-bis(bromoacetoxy)-2-butene; 4,5-dichloro- 1,1 -dithiacyclopentene-3-one; and 2-bromo-2-nitropropane- 1,3-diol.

3. Method according to claim 1 wherein said thiol compound is selected from thioglycolic acid and its alkaline or alkaline earth salts; cysteine; cysteine hydrohalide salts; mercaptoethanol; mercaptopropionic acid; methyl mercaptopropionate; glutathione; and thioglycollate.

4. Method according to claim 1 wherein said biocide is present in an industrial effluent which comprises at least 50 % by weight water, said amount of thiol compound effective to detoxify said biocide is 0.1 parts per million to 2% by weight, based on said industrial effluent, said amount and effective period of time being sufficient to detoxify said effluent so said effluent becomes non-toxic as measured by a photoluminescent bacterial assay.

5. Method according to claim 4 wherein said photoluminescent bacterial assay comprises a photobacterium of the genus Vibrio.

6. Method according to claim 4 wherein said effective amount of thiol compound is 1 to 2 parts by weight per part by weight of biocide in said effluent prior to adding said thiol.

7. Method according to claim 4 wherein said effective period of time is 5 minutes to 4 hours.

8. Method according to claim 4 wherein said industrial effluent is from cooling towers, air washers, paper mills, pulp mills, metal working fluid, manufacture and use, latex manufacture and use, oilfield drilling fluid manufacture and use, fuel bottoms, electrocoating processes, cosmetics manufacture, and household or consumer product manufacture.

9. Method according to claim 4 wherein said effluent is contacted with said thiol compound in a cooling tower prior to discharge, or said effluent is first removed to a separate vessel or container and is then contacted with said thiol compound in said separate vessel or container.

10. Method according to claim 4 wherein said industrial effluent is from a water treatment process, said thiol is cysteine, said period of time is 5 minutes to 1 hour, said effective amount is 1 to 10 parts per million by weight based on effluent, and said biocide is a mixture of 5-chloro-2-methyl-4-isothazolin-3-one; and 2-methyl-4-isothazolin-3-one.

11. Method according to claim 1 wherein said base is an inorganic base.

12. Method according to claim 11 wherein said inorganic base is selected from the group consisting of sodium hydroxide, potassium hydroxide, calcium carbonate, and potassium carbonate.

* * * * *